(12) United States Patent
Lin et al.

(10) Patent No.: US 9,499,344 B2
(45) Date of Patent: Nov. 22, 2016

(54) WORKPIECE TRANSPORT SYSTEM

(71) Applicant: Chiun Mai Communication Systems, Inc., New Taipei (TW)

(72) Inventors: Chien-Yu Lin, New Taipei (TW); Ke-Han Lee, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/641,658

(22) Filed: Mar. 9, 2015

(65) Prior Publication Data

US 2016/0060042 A1   Mar. 3, 2016

(30) Foreign Application Priority Data

Aug. 26, 2014  (CN) .......................... 2014 1 0423426

(51) Int. Cl.
  *B65G 17/16* (2006.01)
  *B65G 17/12* (2006.01)
  *B65G 17/34* (2006.01)

(52) U.S. Cl.
  CPC ............... *B65G 17/16* (2013.01); *B65G 17/12* (2013.01); *B65G 17/34* (2013.01)

(58) Field of Classification Search
  CPC ....... B65G 17/12; B65G 17/16; B65G 17/36
  See application file for complete search history.

(56) References Cited

U.S. PATENT DOCUMENTS

| 7,059,465 | B2* | 6/2006 | Chan ................... B65G 17/123 198/465.3 |
| 8,616,366 | B2* | 12/2013 | Ishino .................. A47F 10/06 198/690.1 |
| 9,126,768 | B2* | 9/2015 | Devaux ............... B65G 17/323 |
| 2015/0083549 | A1* | 3/2015 | Ram ....................... B07C 5/36 198/358 |
| 2015/0251789 | A1* | 9/2015 | Lokkers ................. B65B 5/103 414/273 |
| 2015/0274338 | A1* | 10/2015 | Kawano ............... B65B 35/205 53/556 |

* cited by examiner

*Primary Examiner* — Thomas Randazzo
(74) *Attorney, Agent, or Firm* — Zhigang Ma

(57) ABSTRACT

A workpiece transport system includes a number of holding trays, a conveyor belt, and a number of connecting assemblies corresponding to the trays. Each of the number of holding trays has a first surface with a defined recess for receiving workpieces. Each of the number of holding trays is rotatably connected to the conveyor belt by one of the number of connecting assemblies.

19 Claims, 6 Drawing Sheets

WORKPIECE TRANSPORT SYSTEM

FIELD

The subject matter herein generally relates to workpiece transport systems, and particularly to a workpiece transport system having a plurality of rotatable trays for receiving workpieces to be transported.

BACKGROUND

During manufacturing, workpieces are commonly transported by workpiece transport systems such as conveyor belts and chain conveyors for different manufacturing processes.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
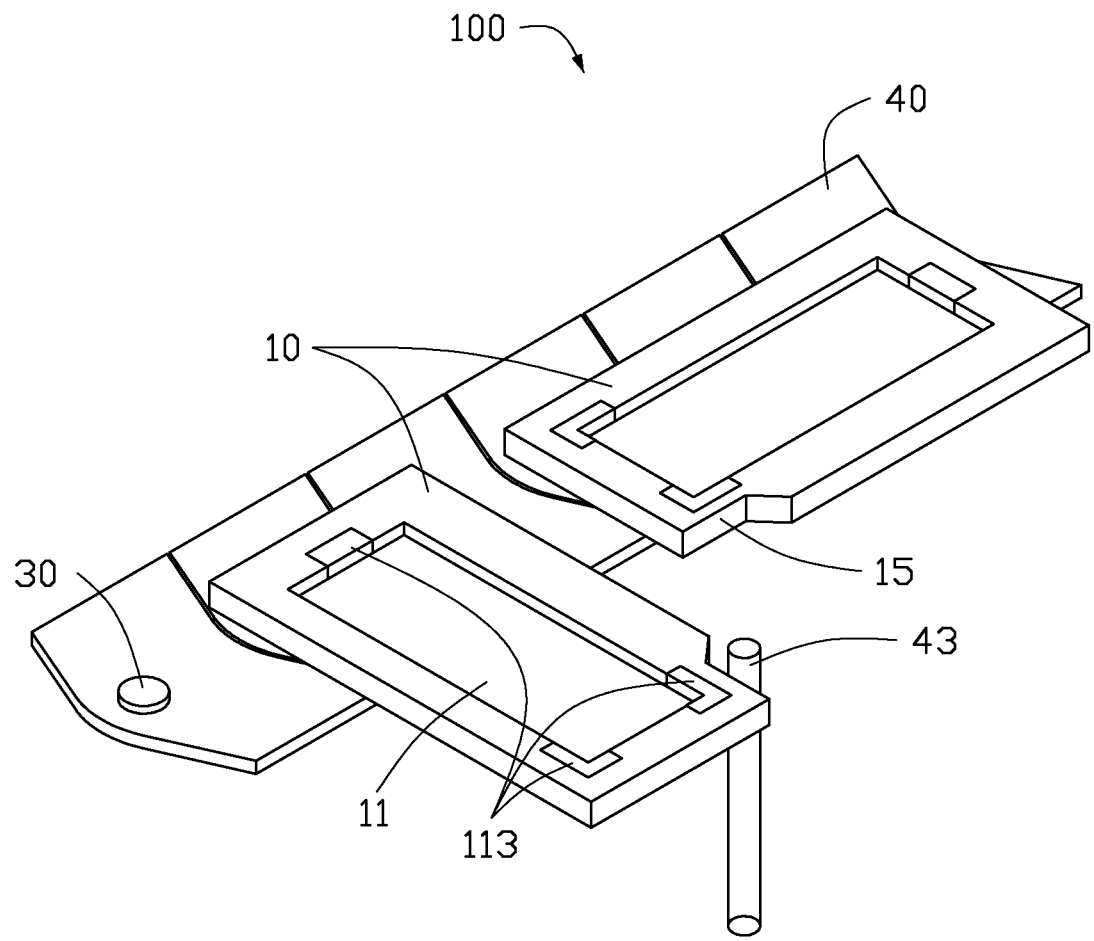
FIG. 1 is an isometric, partial view of a workpiece transport system, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
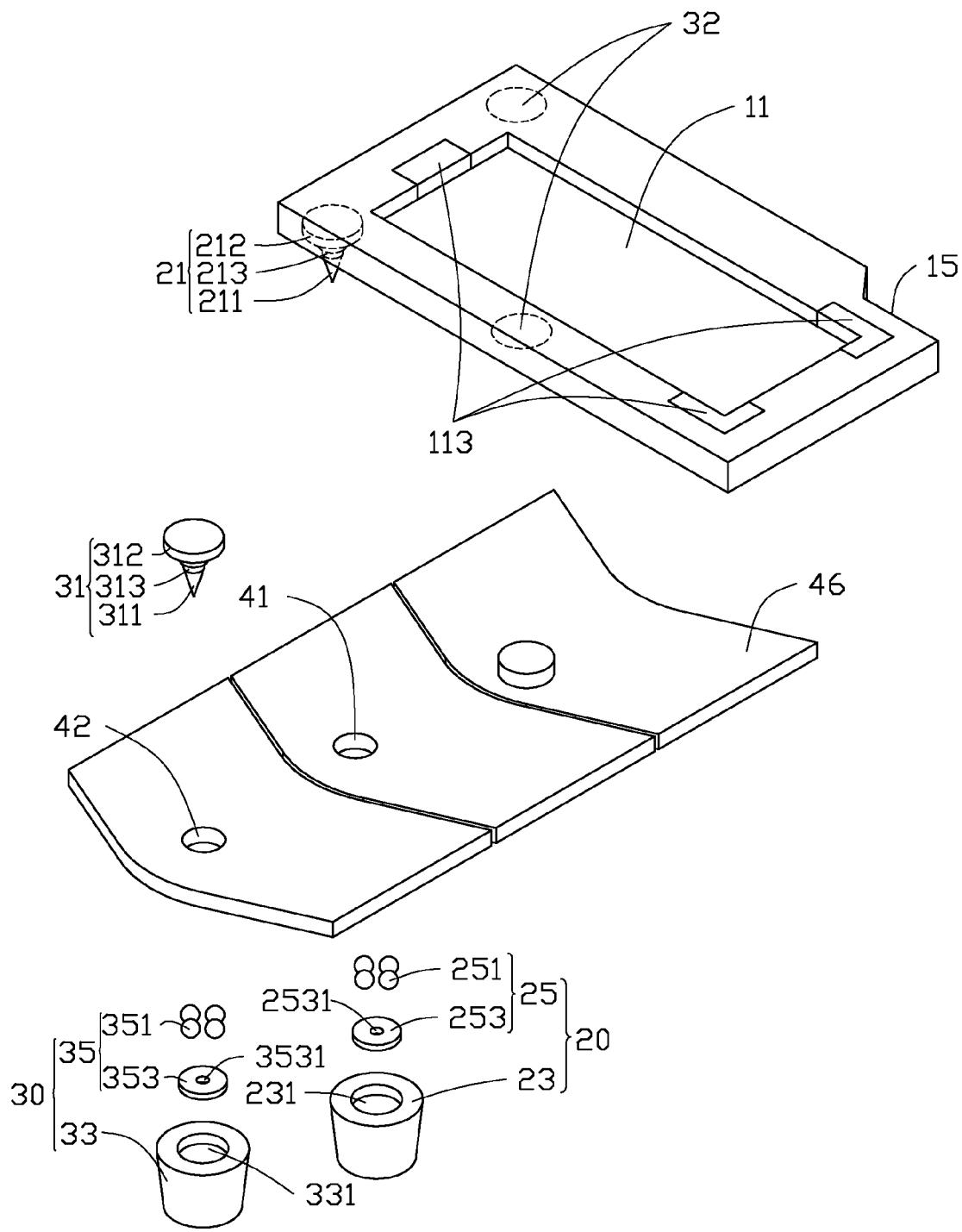
FIG. 2 is an exploded view of the workpiece transport system of FIG. 1.

FIG. 1 is an isometric, partial view of a workpiece transport system 100, according to an exemplary embodiment. The workpiece transport system 100 is configured to transport workpieces during manufacturing. FIG. 2 illustrates that the workpiece transport system 100 includes a plurality of trays 10, a plurality of connecting assemblies 20 corresponding to the trays 10, a positioning assembly 30, and a conveyor belt 40. The trays 10 are configured for transporting workpieces. The connecting assemblies 20 are configured to rotatably assemble the trays 10 to the conveyor belt 40. The positioning assembly 30 is configured to position the trays 10 on the conveyor belt 40.

A receiving chamber 11 is recessed in a first surface of each tray 10 for receiving the workpiece to be transported. At least one latching block 113 is positioned at an edge of the receiving chamber 11. The latching block 113 is configured to resist against the workpiece in the receiving chamber 11 thereby holding the workpiece in the receiving chamber 11. The latching block 113 is made of plastic material. A thickness of the latching block 113 is larger than or equal to a depth of the receiving chamber 11. In this exemplary embodiment, there are three latching blocks 113, wherein two of the latching blocks 113 are positioned in two adjacent corners of the receiving chambers 11 and the other one of the latching blocks 113 is positioned at an edge of the receiving chambers 11. A cutout 15 is defined in each tray 10 in a corner of the tray 10.

Each connecting assembly 20 includes an inserting member 21, a case 23, and a securing member 25. The inserting member 21 includes an inserting portion 211 and a head portion 212. The head portion 212 is connected to the inserting portion 211 and arranged along a same axis as the inserting portion 211. The inserting portion 211 is substantially cone-shaped and has a tip end. A ring-shaped resisting slot 213 is defined in the inserting portion 211 opposite to the tip end. The head portion 212 is substantially cylinder and secured to another end of the inserting portion 211 adjacent to the resisting chamber 213. A receiving cavity 231 is defined in the case 23 to receive the securing member 25. The securing member 25 is configured to position the inserting member 21. The securing member 25 includes a plurality of resisting members 251 and a pad 253. In this exemplary embodiment, there are four resisting members 251, and each resisting member 251 is substantially a plurality of beads. A positioning hole 2531 is defined in a center portion of the pad 253. The securing member 25 is received in the receiving cavity 231 with the resisting members 251 positioned on the pad 253. In this exemplary embodiment, the inserting member 21 and the pad 253 are made of metallic material or magnetic material so that the inserting member 21 and the pad 253 can be attracted to each other. In addition, the pad 253 can be moved up and down the receiving cavity 231 by an external magnetic force.

Figure 3:
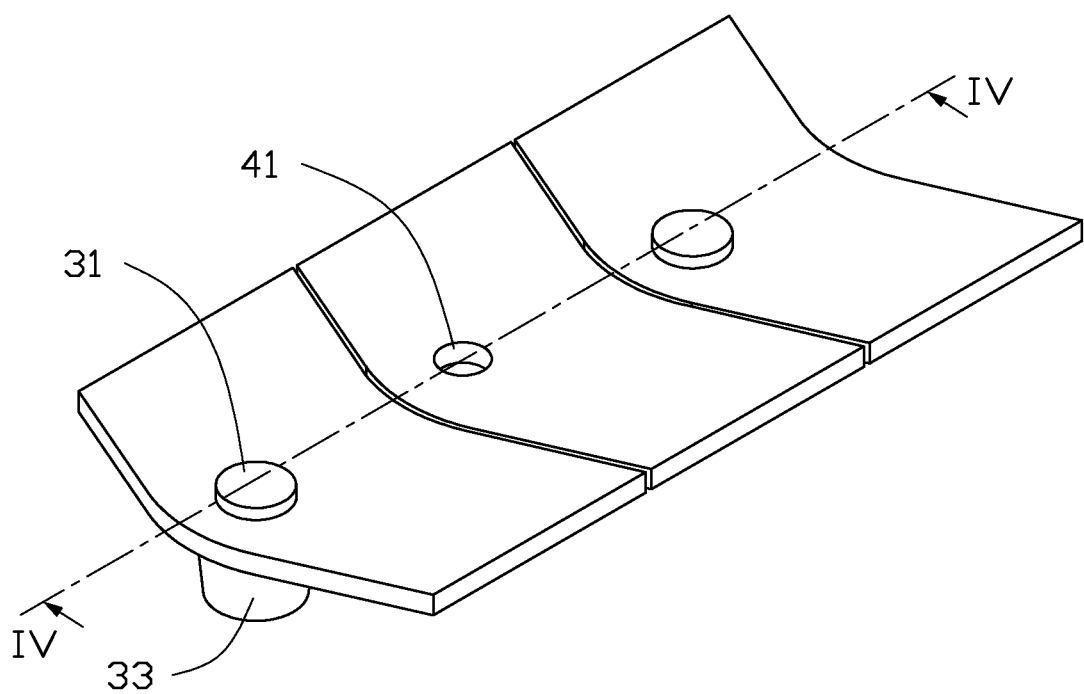
FIG. 3 is an isometric, partial view of a conveyor belt assembled with a case, a securing member, and a plurality of first positioning portions of the workpiece transport system of FIG. 1.
Figure 4:
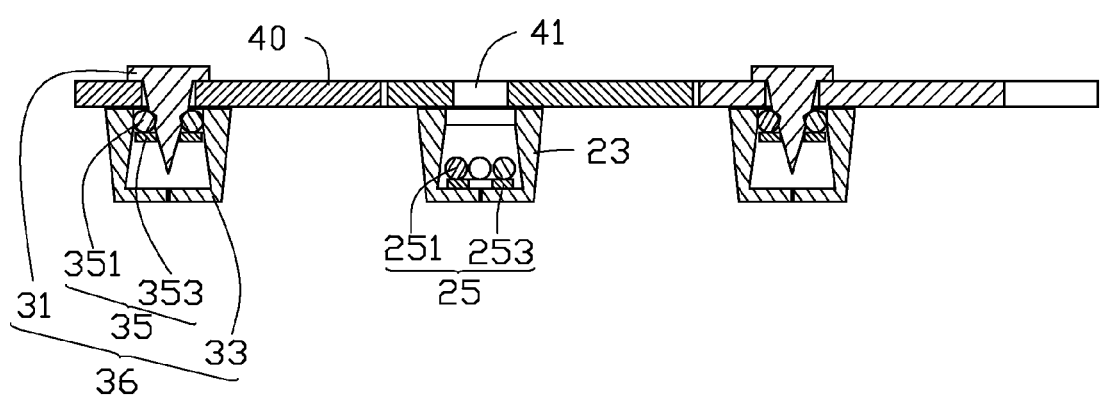
FIG. 4 is a cross-sectional view of the conveyor belt of FIG. 3 along line IV-IV.

FIGS. 3 and 4 illustrate that the positioning assembly 30 includes a plurality of first positioning portions 36 and a plurality of second positioning portions 32. The structure of each first positioning portion 36 is substantially similar to that of the connecting assembly 20 and includes an inserting member 31, a case 33, and a securing member 35. The inserting member 31 includes an inserting portion 311 and a head portion 312. The head portion 312 is connected to the inserting portion 311 and arranged along a same axis as the inserting portion 311. The inserting portion 311 is substantially cone-shaped and has a tip end. A ring-shaped resisting slot 313 is defined in the inserting portion 311 opposite to the tip end. The head portion 312 is substantially cylinder and secured to an end of the inserting portion 311 adjacent to the resisting slot 313. A receiving cavity 331 is defined in the case 33 to receive the securing member 35. The securing member 35 includes a plurality of resisting members 351 and a pad 353. In this exemplary embodiment, there are four resisting members 351, and each resisting member 351 is substantially a ball. A positioning hole 3531 is defined in a center portion of the pad 353. The securing member 35 is received in the receiving cavity 331 with the resisting members 351 positioned on the pad 353. In this exemplary embodiment, the inserting member 31 and the pad 353 are made of metallic material or magnetic material so that the inserting member 31 and the pad 353 can be attracted to each other. In addition, the pad 353 can be moved up and down the receiving cavity 331 by an external magnetic force.

The second positioning portion 32 includes a pair of positioning members. The positioning members 32 are substantially cylinders and secured on the second surface of one tray 10. The first positioning portion 36 can be magnetically attracted to one of the positioning members 32 thereby positioning the tray 10 on the conveyer belt 40.

Figure 5:
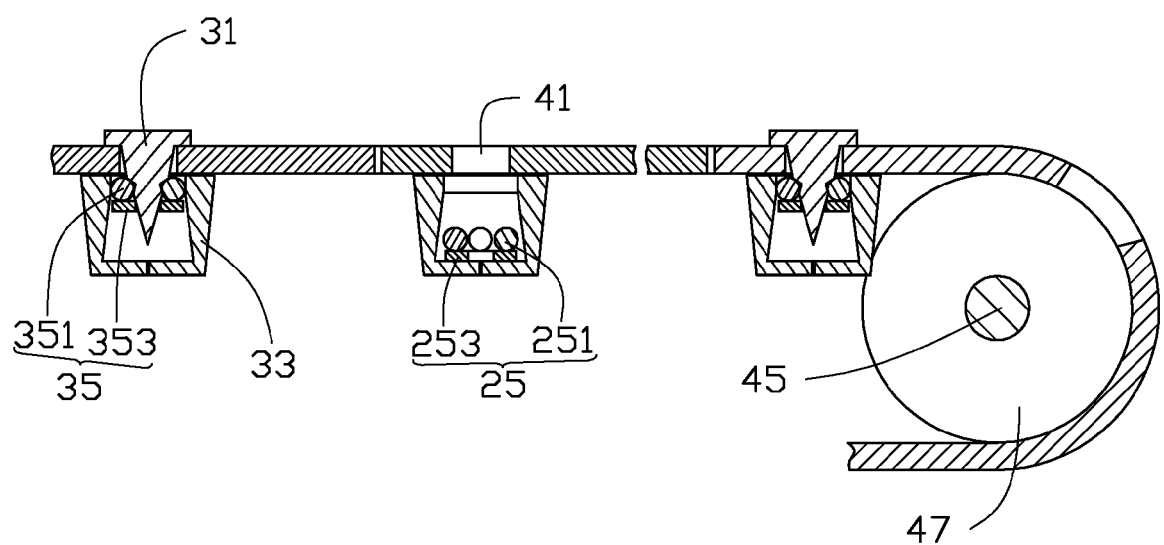
FIG. 5 is a cross-sectional, partial view of the workpiece transport system.

The conveyor belt 40 includes a plurality of belt segments 46 connected together and two conveyor rollers 47 (only one conveyor roller schematically shown in FIG. 5). The conveyor rollers 47 are located at an initial end and an rear end of the conveyor belt 40. The connected belt segments 46 are sleeved around the conveyor rollers 47 so that the conveyor rollers 47 can be rotated to drive the connected belt segments 46 to move from the initial end to the rear end.

A plurality of connecting holes 41 and a plurality of inserting holes 42 are alternately defined and evenly spaced in the conveyor belt 40. The connecting holes 41 and the inserting holes 42 are configured for inserting the inserting members 21, 31. In this exemplary embodiment, every two adjacent belt segments 46 defines one of the connecting holes 41 and one of the inserting hole 42, respectively.

In assembly, each inserting member 21 is secured on one of the trays 10. In this exemplary embodiment, each head portion 212 is secured on a corner of a second surface of one of trays 10 opposite to the receiving chamber 11. The resisting members 251, 351 and the pads 253, 353 are received in the corresponding cases 23, 35. The case 23, 33 are alternately secured on a back surface of each conveyor segments 46 with the receiving cavities 231, 331 communicating with the connecting holes 41 and the inserting holes 42, respectively. Each inserting member 21 is extended through one corresponding connecting hole 41 with the inserting portion 211 inserted into the positioning hole 2531 and the resisting members 251 resisting against the resisting slot 213 thereby rotatably assembling the tray 10 to the conveyor belt 40.

Each inserting member 31 is extended through one corresponding inserting hole 42 with the inserting portion 311 inserted into the positioning hole 3531. The inserting member 31 is attracted to the pad 35 and the resisting members 351 resist against the resisting slot 313 so that the first positioning portion 36 is assembled on the conveyor belt 40. The second positioning portions 32 are secured on the trays 10. In this exemplary embodiment, one positioning member 32 is secured on a corner of the second surface of one of the trays 10 adjacent to the head portion 212, another positioning member 32 is secured on an edge of the second surface of one of the trays 10. The first positioning portion 36 can be magnetically attracted to one of the positioning members 32 thereby positioning the tray 10 on the conveyor belt 40.

Figure 6:
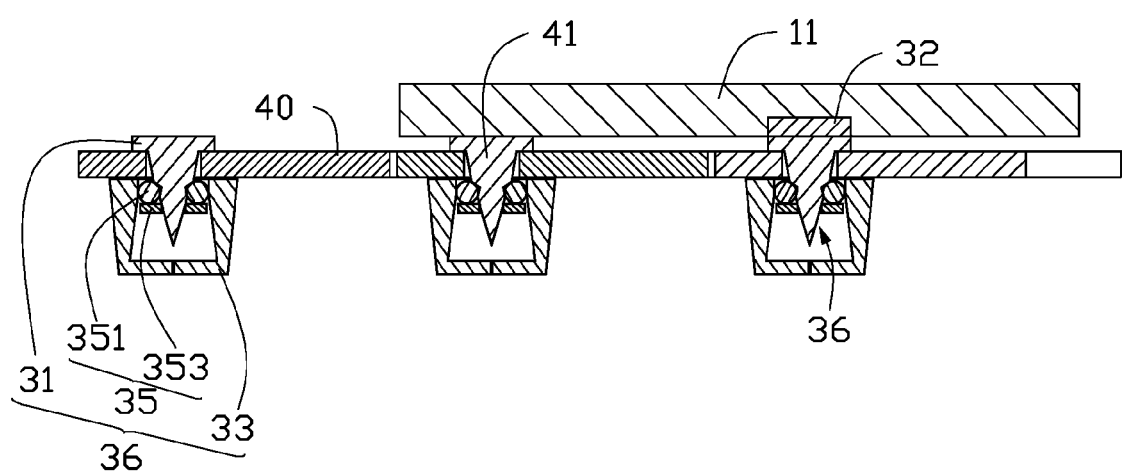
FIG. 6 is a cross sectional view of the workpiece transport system of FIG. 1.

FIG. 6 illustrates that, in use, the workpieces are placed on the trays 10. The first positioning portions 36 are magnetically attracted to one of the positioning members 32 to position the tray 10. In this exemplary embodiment, a plurality of rods 43 (shown in FIG. 1) are positioned at two sides of the conveyer belt 40 and resisted against the cutouts 15 of the trays 10. When the conveyer belt 40 is driven to move, each tray 10 is rotated relative to the conveyer belt 40 by the rods 43 and the first positioning portion 36 is magnetically attracted to another positioning member 32. In this exemplary embodiment, the trays 10 can be rotated 90 degrees relative to the conveyer belt 40.

In other embodiments, two magnetic members 45 (shown in FIG. 5) are positioned in end a center of each conveyor roller 47. The magnetic members 45 temporarily attract the pads 253 to move down the receiving cavities 231 so that the inserting member 21 can be easily inserted into conveyor belt 40 to attach the tray 10 to the conveyor belt 40 at the initial end and can be removed from the pads 253 allowing the trays 10 to be removed from the conveyor belt 40 at the rear end. Therefore, the trays 10 can be easily removed from the conveyor belt 40 at the rear end and reattached to the conveyor belt 40 at the initial end. In this exemplary embodiment, the magnetic members 45 can be electromagnets.

In addition, a through hole can be defined in each tray 10. Each inserting member 21 can be extended through the through hole and the connecting hole 41 and then is positioned by the securing member 25 to rotatably assemble the tray 10 to the conveyor belt 40.

The workpiece transport system 100 can transport the workpieces with the trays 10 rotatably assembled to the conveyor belt 40 so that the workpieces may not easily drop from the conveyor belt 40. Moreover, the trays 10 can be rotated relative to the conveyor belt 40 to be suitable for a relative narrow and small working space, a range of sizes that can be transported by the trays 10 is also increased.

It is to be understood, however, that even through numerous characteristics and advantages of the present disclosure have been set forth in the foregoing description, together with details of assembly and function, the disclosure is illustrative only, and changes may be made in the details, especially in the matters of shape, size, and arrangement of parts within the principles of the disclosure to the full extent indicated by the broad general meaning of the terms in which the appended claims are expressed.

What is claimed is:

1. A workpiece transport system comprising:
a conveyer belt;
a plurality of holding trays; and
a plurality of connecting assemblies;
wherein, each of the plurality of holding trays has a first surface with a defined recess for receiving workpieces; and
wherein, each of the plurality of holding trays is rotatably connected to the conveyer belt by one of the plurality of connecting assemblies, during transporting workpieces, each of the plurality of holding trays is rotated from a first position substantially perpendicular to the conveyer belt to a second positioned substantially parallel to the conveyer belt.

2. The workpiece transport system of claim 1, further comprising a positioning assembly, wherein the positioning assembly comprises a plurality of first positioning portions and a plurality of second positioning portions; each second positioning portion comprises a pair of positioning members secured on one tray, each positioning portion attracts to one of the positioning members to position the tray.

3. The workpiece transport system of claim 1, wherein each tray further comprises at least one latching block positioned at an edge of the recess.

4. The workpiece transport system of claim 1, further comprising a plurality of rods positioned at two side of the conveyer belt, wherein each tray further defines a cutout, each rod resists against the cutout of one tray.

5. The workpiece transport system of claim 1, wherein each of the plurality of connecting assemblies comprises an inserting member, the conveyer belt defines a plurality of connecting holes corresponding to the connecting assemblies, each inserting member comprises a head portion secured on the tray and an inserting portion extended through one corresponding connecting hole of the conveyer belt.

6. The workpiece transport system of claim 5, wherein each of the plurality of connecting assembly further comprises a case and a securing member received in the case; each case is secured on a back surface of the conveyer belt aligning with one corresponding connecting hole, each inserting portion is positioned by one corresponding securing member.

7. The workpiece transport system of claim 6, wherein the securing member comprises a pad and a plurality of resisting members positioned on the pad; the inserting portion defines a ring-shaped resisting slot; the pad is attracted to the inserting member and the resisting members resist around the resisting slot.

8. The workpiece transport system of claim 7, wherein each pad defines a positioning hole at a center portion of the pad, the inserting portion has a tip end extended through the positioning hole.

9. The workpiece transport system of claim 7, further comprising a plurality of magnetic members position at an initial end and an rear end of the conveyer belt, the magnetic members temporarily attract the pads to move down the receiving cavities until the inserting portion is removed from the pad.

10. A workpiece transport system comprising:
a plurality of trays, each tray defining a receiving slot configured for receiving a workpiece;
a conveyer belt defining a plurality of connecting holes corresponding to the trays; and
a plurality of connecting assemblies corresponding to the connecting holes, each of the plurality of connecting assemblies comprising:
an inserting member rotatably connecting one of the trays to the conveyer belt;
a case; and
a securing member received in the case;
wherein each case is secured on a back surface of the conveyer belt aligning with one corresponding connecting hole, each inserting portion is positioned by one corresponding securing member.

11. The workpiece transport system of claim 10, wherein the securing member comprises a pad and a plurality of resisting members positioned on the pad; the inserting portion defines a ring-shaped resisting slot; the pad is attracted to the inserting member and the resisting members resist around the resisting slot.

12. The workpiece transport system of claim 10, further comprising a positioning assembly, wherein the positioning assembly comprises a plurality of first positioning portions and a plurality of second positioning portions; each second positioning portion comprises a pair of positioning members secured on one tray, each positioning portion attracts to one of the positioning members to position the tray.

13. The workpiece transport system of claim 12, wherein each of the plurality of first positioning portion comprises an inserting member, the conveyer belt defines a plurality of inserting holes corresponding to the first positioning portions, each inserting member comprises a head portion and an inserting portion extended through one corresponding inserting hole of the conveyer belt.

14. The workpiece transport system of claim 13, wherein each of the plurality of first positioning portion further comprises a case and a securing member received in the case; each case is secured on a back surface of the conveyer belt aligning with one corresponding inserting hole, each inserting portion is positioned by one corresponding securing member.

15. The workpiece transport system of claim 14, wherein the securing member comprises a pad and a plurality of resisting members positioned on the pad; the inserting portion defines a ring-shaped resisting slot; the pad is attracted to the inserting member, and the resisting members resist around the resisting slot.

16. A workpiece transport system comprising:
a conveyer belt;
a plurality of holding trays; and
a plurality of connecting assemblies; and
a positioning assembly;
wherein, each of the plurality of holding trays has a first surface with a defined recess for receiving workpieces; and
wherein, each of the plurality of holding trays is rotatably connected to the conveyer belt by one of the plurality of connecting assemblies;
wherein, the positioning assembly comprises a plurality of first positioning portions and a plurality of second positioning portions; each second positioning portion comprises a pair of positioning members secured on one tray, each positioning portion attracts to one of the positioning members to position the tray.

17. The workpiece transport system of claim 16, wherein each of the plurality of first positioning portion comprises an inserting member, the conveyer belt defines a plurality of inserting holes corresponding to the first positioning portions, each inserting member comprises a head portion and an inserting portion extended through one corresponding inserting hole of the conveyer belt.

18. The workpiece transport system of claim 17, wherein each of the plurality of first positioning portion further comprises a case and a securing member received in the case; each case is secured on a back surface of the conveyer belt aligning with one corresponding inserting hole, each inserting portion is positioned by one corresponding securing member.

19. The workpiece transport system of claim 18, wherein the securing member comprises a pad and a plurality of resisting members positioned on the pad; the inserting portion defines a ring-shaped resisting slot; the pad is attracted to the inserting member, and the resisting members resist around the resisting slot.

* * * * *